UNITED STATES PATENT OFFICE.

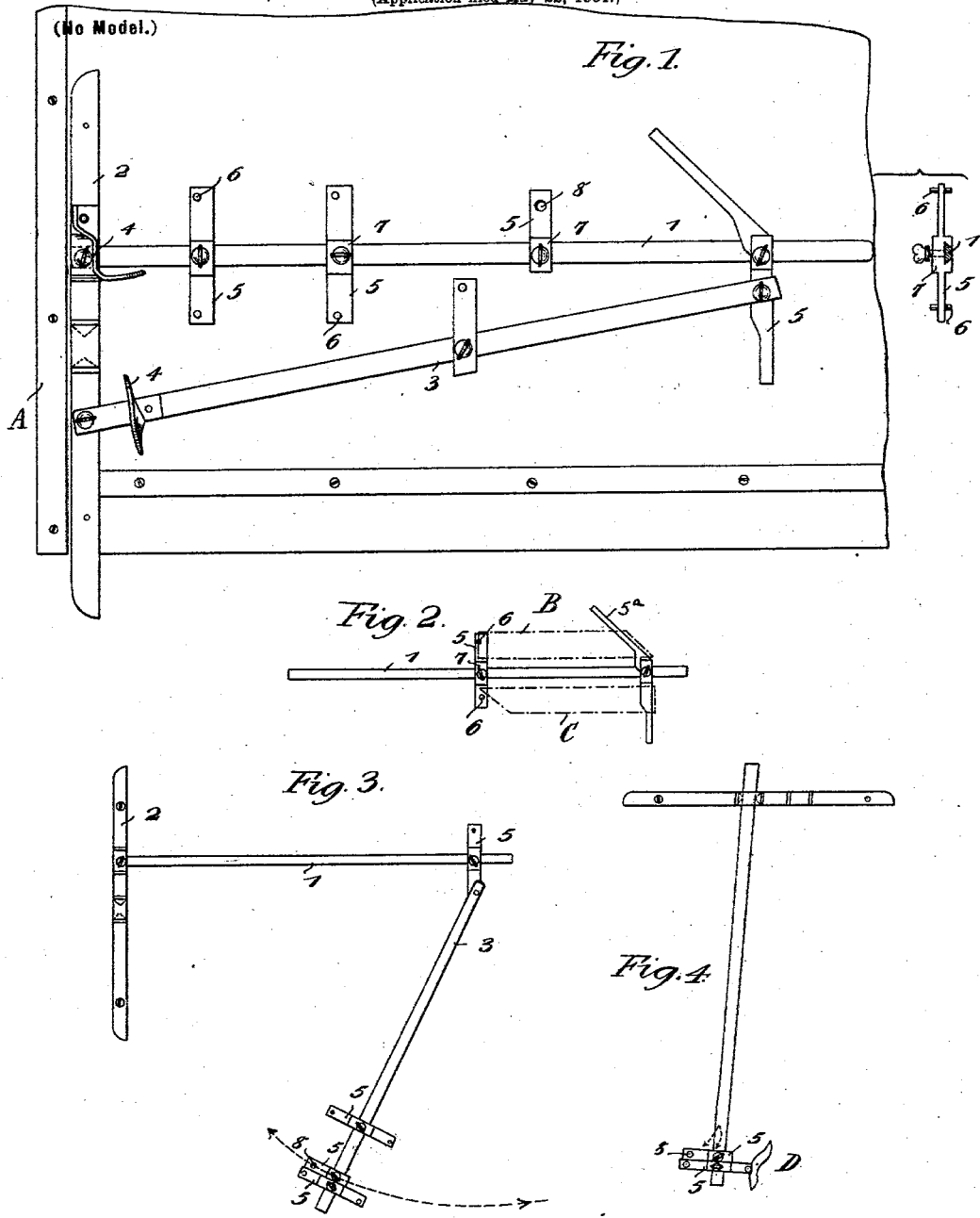

WILHELM PANNKOKE, OF BERLIN, GERMANY.

DEVICE FOR CUTTING GLASS.

SPECIFICATION forming part of Letters Patent No. 715,288, dated December 9, 1902.

Application filed May 22, 1901. Serial No. 61,443. (No model.)

*To all whom it may concern:*

Be it known that I, WILHELM PANNKOKE, of No. 23 Hollmannstrasse, Berlin, in the German Empire, have invented new and useful Improvements in Devices for Cutting Glass, of which the following is a statement.

My invention relates to improvements in devices for cutting glass; and the objects of my improvements are to simplify and cheapen the construction of such devices and to render the same more efficient, serviceable, and durable in operation.

In the annexed drawings, Figure 1 is a plan view of my improved device complete, showing side view of one of the slides. Figs. 2, 3, and 4 illustrate modes of employing the same.

The device consists of a rod or bar 1, to one end of which the guide-rail or straight-edge 2 is attached at a suitable angle. A tie 3 may also be employed to connect the guide-rail 2 with the rod or bar 1, the connection of the tie 3 with rod 1 being effected by means of a slide 5, a number of which are or may be mounted on the rod or bar 1. On the guide-rail 2 as well as the tie 3 may be provided handles or suitably-shaped plates 4, against which the fingers can rest. The slides 5 for guiding the glazier's diamond may be provided with pins 6, and rotatable shanks or arms may be connected with the slides, so that strips of glass can be recut into any desired shape. The edges of these glass strips or the like can be cut at any angle desired, and the strips can be beveled without necessitating any loss of material. For this purpose the strips are placed against the pins 6 and shoulder 7 of one of the slides 5, Fig. 2, and a second slide is then placed at another point on the rod 1, determined by the length of the strip. In making the cut the shank 5ᵃ of the second slide 5 serves as a guide for the diamond. In this manner and by means of the organs referred to bevel-pieces can be produced without any loss by simply reversing the strips from the position B into the position C, Fig. 2. The guide-rail 2 is moved along the abutment-ledge A of the cutting-table, Fig. 1, and after adjusting and fixing the slides 5 separate strips or pieces can be cut in succession without necessitating their separation after each cut. An auxiliary or intermediary slide may be mounted on the tie 3.

Another mode of employment of my improved device is shown in Fig. 3, in which the tie 3 is detached from the guide-rail 2, which latter is secured on the work-table. The point at which the tie 3 is pivoted serves as a center for describing circles or segments of same, so that said tie can be employed as a radius-bar to guide the glazier's diamond in cutting circles or curves without requiring a pattern. The center of the tie 3 obviously rests upon the glass, which latter is placed on the drawing or pattern D'.

The glazier's diamond is either inserted into the hole 8, provided for the purpose in the slides 5, or it bears against the edge of same during the cutting operation. By fixing two slides 5 upon the tie 3 and movably mounting a third slide between the two fixed slides cuts concentric to each other can be made. The first cut would be made when the movable slide bears against the outer fixed slide 5 and the second cut when the movable slide bears against the inner fixed slide. This manner of employment of my improved device is shown in Fig. 3. The rod or bar 1 may also be loosely jointed to the guide-rail 2 and the latter then fixed at any desired point on the work-table. Further, the rod 1 may be guided between two pins secured on the work-table. In this case there is provided on the end of the rod 1 a slide for guiding the glazier's diamond and also a slide provided with pins, one of which is led along the edge of the pattern D' to be reproduced, the cutting operation being executed in the manner illustrated in Fig. 4.

It is obvious that the slides may be mounted on the rod or bar 1 and tie 3 in any suitable manner; but I have found it preferable to provide a groove in the under surface of same corresponding to the transverse section of the rods or bars, as shown in Fig. 1, so that the slides can only be mounted at the ends of said rods. The screws for fixing the slides and rods in position may obviously be of any well-known type.

I do not restrict myself to the exact shape or to any particular dimensions of the different parts which constitute my improved device, as many modifications may be made without departing from the spirit and scope of the invention.

Having now particularly described and ascertained the nature of my invention and in what manner the same is to be performed, I declare that what I claim, and desire to secure by Letters Patent of the United States, is—

1. A device for cutting glass, comprising in combination a guide-rail; a bar connected to said rail; slides adapted to be moved along, and fixed on, said bar, said slides being provided with holes; pins secured to said slides; and a tie detachably pivoted at one end to said rail and at the other end to a slide on said bar; substantially as, and for the purpose, set forth.

2. A device for cutting glass, comprising in combination a guide-rail; a bar connected to said rail; slides adapted to be moved along, and fixed on, said bar, said slides being provided with holes; pins secured to said slides; a tie detachably pivoted at one end to said rail and at the other end to a slide on said bar; a handle-piece on said rail; and a handle-piece on said tie; substantially as, and for the purpose, set forth.

3. A device for cutting glass, comprising in combination a guide-rail; a bar connected to said rail; slides adapted to be moved along, and fixed on, said bar, said slides being provided with holes; shanks on said slides; pins secured to said slides; and a tie detachably pivoted at one end to said rail and at the other end to a slide on said bar; substantially as, and for the purpose, set forth.

In witness whereof I have hereunto set my hand in the presence of two witnesses.

WILHELM PANNKOKE.

Witnesses:
WOLDEMAR HAUPT,
HENRY HASPER.